United States Patent Office 3,249,613
Patented May 3, 1966

3,249,613
DIMETHYLPIPERAZINE PRODUCTION
Simon P. Burns and Philip H. Moss, Austin, Tex., assignors to Jefferson Chemical Company, Inc., Houston, Tex., a corporation of Delaware
No Drawing. Filed Nov. 1, 1963, Ser. No. 320,925
3 Claims. (Cl. 260—268)

This invention relates to the production of dimethylpiperazine. More particularly, this invention relates to the production of 1,4-dimethylpiperazine from piperazine, formaldehyde and hydrogen.

Heretofore 1,4-dimethylpiperazine has been prepared by the methylation of piperazine according to the procedure described by Eschweiler [Ber. 38, 880 (1905)] or modifications of that procedure. These prior art procedures suffer from two serious disadvantages. First, large excesses of formaldehyde and formic acid are employed. As a result of the use of an excess of formic acid, the desired product is present in the reaction mixture as the formate salt and elaborate separation procedures must be employed to obtain the pure product. Second, in the methylation of a polyamine such as piperazine, there is a tendency for the polyamine and formaldehyde to form a polymer.

A new process for the production of 1,4-dimethylpiperazine which overcomes the disadvantages of the prior art processes has now been discovered. This process is a two-step process in which a solution of piperazine in a suitable solvent is added to a slight excess of formaldehyde and this reaction mixture, comprising piperazinedimethanol, is then hydrogenated over a metallic hydrogenation catalyst to produce the desired 1,4-dimethylpiperazine. Excellent yields have been obtained by the use of this process.

Since there is no formic acid or other acid present in the reaction system, the 1,4-dimethylpiperazine is present in the product mixture in the free state. The dimethylpiperazine can thus be separated from the reaction mixure by any suitable means, such as, for example, distillation.

In order to avoid the formation of a polymer during the reaction between the piperazine and formaldehyde, the piperazine should be added to the formaldehyde rather than the reverse. Also, the reaction mixture should be well stirred and about a 10% excess of formaldehyde should be emploeyd. A larger excess of formaldehyde may be used if desired; however, more formaldehyde is not necessary. We have also discovered that if the piperazine concentration in the reaction mixture exceeds about 18 wt. percent, a polymer will be formed regardless of whether or not the other precautions are observed. Accordingly, piperazine should constitute less than about 18 wt. percent of the total reaction mixture.

Both the piperazine and formaldehyde should be in solution in a suitable solvent. Formaldehyde may be employed as a formalin solution, in which event no additional solvent for the formaldehyde is necessary. The formaldehyde may also be employed in any other of its forms.

Suitable solvents for this step of the process are those inert solvents in which both piperazine and 1,4-piperazinedimethanol are soluble. The lower aliphatic alcohols, such as, for example, methanol, ethanol and propanol are excellent solvents for this reaction. Other suitable solvents include, for example, glycol mono- and diethers, dioxane, lower tertiary amines and water. The reaction proceeds quite readily at ambient temperatures of around 20° to 25° C., or higher temperatures may be employed if desired. The upper temperature limit is the boiling point of the solvent unless a closed system is employed and the reaction is run under pressure. A temperature of about 50° C. has been found to be particularly advantageous.

The solution obtained from the first step in the process may then be hydrogenated directly but is preferably filtered prior to hydrogenation. The hydrogenation may be conducted at a temperature within the range of about 50° to about 200° C. at a pressure sufficient to keep the components in the liquid state. Such a pressure is within the range of about 50 to about 3000 p.s.i.g.

In conducting the hydrogenation step, a metallic hydrogenation catalyst is employed. Examples of suitable catalysts are well known to those skilled in the art. Such catalysts include, for example, platinum, nickel and copper-chromium oxide catalysts. We have found nickel-copper-chromium catalysts to be particularly effective. Catalysts of this type will consist of 44 to 94 atom percent nickel, 5 to 55 atom percent copper and 1 to 5 atom percent chromium. A specific preferred catalyst is one consisting of 75% nickel oxide, 22% cupric oxide and 3% chromic oxide.

The results from a series of runs in which the first step of the process was conducted under various conditions are summarized in Table I. The purpose of these runs was to study polymer formation, and the products were allowed to stand for several months. In these reactions the formaldehyde was employed as a formalin solution and the solvent used for the piperazine was methanol.

Table I

| Run No. | Maximum Reaction Temp., °C. | Excess Formaldehyde, Wt. Percent | Piperazine Concentration, Wt. Percent | Remarks and Observations |
|---|---|---|---|---|
| 1 | 47 | 0 | 12.8 | Solids formed during a one-month period. |
| 2 | 49 | 10 | 12.8 | No solids after three months. |
| 3 | 50 | 0 | 12.8 | Solids formed during a one-month period. |
| 4 | 50 | 10 | 16.5 | Insignificant amount of solids formed during a three-month period. |
| 5 | 49 | 10 | 18.3 | Large amount of solids formed during a one-month period. |

In a typical run, the hydrogenation step of the process was conducted in the following manner.

The reaction mixture from the first step, comprising 1,4-piperazinedimethanol, was filtered and hydrogenated using a nickel-copper-chromia catalyst comprising 75% nickel oxide, 22% cupric oxide and 3% chromic oxide at a temperature of 115° C., and a pressure of 2500 p.s.i.g. using a 20 mol percent excess of hydrogen. The hydrogenated crude product was then distilled to yield 1,4-dimethylpiperazine of high purity. The over-all yield of 1,4-dimethylpiperazine was 88.7 mol percent based on piperazine.

As stated hereinabove, the 1,4-dimethylpiperazine product is present in the hydrogenated reaction mixture in the free state and may be separated from the mixture by any suitable means.

Having thus described our invention what is claimed is:

1. A method for preparing 1,4-dimethylpiperazine which comprises:
    (A) adding a solution of piperazine in an inert solvent to at least about a 10% excess of formaldehyde in an inert solvent to thereby obtain 1,4-piperazinedimethanol, said piperazine constituting less than about 18 wt. percent of the reaction mixture; and
    (B) hydrogenating the 1,4-piperazinedimethanol to 1,4-dimethylpiperazine employing a metallic hydrogenation catalyst at a temperature of from about 50° to about 200° C. and a pressure of from about 50 to about 3000 p.s.i.g.

2. A method as in claim 1 wherein the inert solvent is a lower aliphatic alcohol selected from the group consisting of methanol, ethanol and propanol and the metallic hydrogenation catalyst is a nickel-copper-chromia catalyst.

3. A method for preparing 1,4-dimethylpiperazine which comprises:
(A) adding a methanolic solution of piperazine to at least about a 10% excess of formalin solution at a temperature of from about 20° to about 50° C. to thereby obtain 1,4-piperazinedimethanol, said piperazine constituting less than about 18 wt. percent of the reaction mixture; and
(B) hydrogenating the 1,4-piperazinedimethanol to 1,4-dimethylpiperazine employing a nickel-copper-chromia hydrogenation catalyst at a temperature of from about 50° to about 200° C. and a pressure of from about 50 to about 3000 p.s.i.g.

No references cited.

HENRY R. JILES, *Acting Primary Examiner.*
JAMES W. ADAMS, JR., *Assistant Examiner.*